US012694405B2

(12) United States Patent
Kumar et al.

(10) Patent No.: US 12,694,405 B2
(45) Date of Patent: Jul. 28, 2026

(54) SYSTEM AND METHOD FOR PRIORITIZING CUSTOMER DATA

(71) Applicant: Actimize Ltd., Ra'anana (IL)

(72) Inventors: Sumit Kumar, Pune (IN); Sunny Tholar, Pune (IN); Prasad Mhatre, Pune (IN)

(73) Assignee: Actimize Ltd. (IL)

( * ) Notice: Subject to any disclaimer, the term of this patent is extended or adjusted under 35 U.S.C. 154(b) by 61 days.

(21) Appl. No.: 18/756,526

(22) Filed: Jun. 27, 2024

(65) Prior Publication Data

US 2026/0004297 A1    Jan. 1, 2026

(51) Int. Cl.
 *G06Q 20/40*    (2012.01)
(52) U.S. Cl.
 CPC ................................. *G06Q 20/4016* (2013.01)
(58) Field of Classification Search
 CPC .................................................. G06Q 20/4016
 See application file for complete search history.

(56) References Cited

U.S. PATENT DOCUMENTS

| | | | |
|---|---|---|---|
| 2024/0062041 A1* | 2/2024 | Choudhary | G06N 3/042 |
| 2025/0217952 A1* | 7/2025 | Huff | G06T 7/194 |
| 2025/0259004 A1* | 8/2025 | Sharpe | G06F 40/284 |
| 2025/0259012 A1* | 8/2025 | Sharpe | G06F 40/40 |
| 2025/0390879 A1* | 12/2025 | Marcus | G06Q 20/4016 |

OTHER PUBLICATIONS

Unknown, Open Database Connectivity, Mar. 24, 2022, www. wikipedia.org, Open Database Connectivity definition (Year: 2022).*

* cited by examiner

*Primary Examiner* — Scott S Trotter

(57)    ABSTRACT

A system and method for prioritizing customer data may include a computing device; a memory; and a processor, the processor configured to: use of one or more datasets of tabular customer data to generate one or more analysis prompts; apply the one or more analysis prompts to a machine learning model to generate a vector; and generate a prioritization of the one or more customer datasets by comparing a prioritization value of the vector to threshold values.

17 Claims, 13 Drawing Sheets

<u>300</u>

USING ONE OR MORE CUSTOMER DATASETS OF TABULAR DATA TO GENERATE ONE OR MORE ANALYSIS PROMPTS.  302

APPLYING SAID ONE OR MORE ANALYSIS PROMPTS TO A MACHINE LEARNING MODEL TO GENERATE A VECTOR FOR EACH CUSTOMER DATASET, WHEREIN SAID VECTOR COMPRISES A PRIORITIZATION VALUE.  304

GENERATING A PRIORITIZATION OF SAID ONE OR MORE CUSTOMER DATASETS BY COMPARING PRIORITIZATION VALUE OF SAID VECTOR TO THRESHOLD VALUES.  306

FIG. 3

Example of Alert Routing

Training Data

| Percentile | Min Score | Max Score | True Positives | False Positives | TP Rate | FP Rate | Cumulated TP Rate | Cumulated FP Rate | KS | Classification | Alert % | Precision |
|---|---|---|---|---|---|---|---|---|---|---|---|---|
| 0 | 0.8138424 | 0.9987888 | 728 | 0 | 27.41% | 0.00% | 27.41% | 0.00% | 27.4 | SAR Preparation | 1.00% | 100.00% |
| 1 | 0.5642257 | 0.8137472 | 644 | 84 | 24.25% | 0.12% | 51.66% | 0.12% | 51.5 | | | |
| 2 | 0.3297857 | 0.5640106 | 441 | 287 | 16.60% | 0.41% | 68.26% | 0.53% | 67.7 | | | |
| 3 | 0.1912434 | 0.3291938 | 273 | 454 | 10.28% | 0.65% | 78.54% | 1.18% | 77.4 | | | |
| 4 | 0.119463 | 0.1904296 | 121 | 607 | 4.56% | 0.87% | 83.09% | 2.04% | 81.1 | | | |
| 5 | 0.0863356 | 0.1194551 | 52 | 676 | 1.96% | 0.96% | 85.05% | 3.01% | 82 | Level 2 Investigation | 8.54% | 26.61% |
| 6 | 0.0687063 | 0.0862821 | 42 | 685 | 1.58% | 0.98% | 86.63% | 3.98% | 82.7 | | | |
| 7 | 0.0574321 | 0.0686005 | 35 | 693 | 1.32% | 0.99% | 87.95% | 4.97% | 83 | | | |
| 8 | 0.0509401 | 0.0574126 | 38 | 690 | 1.43% | 0.98% | 89.38% | 5.96% | 83.4 | | | |
| 9 | 0.0482381 | 0.0509381 | 8 | 386 | 0.30% | 0.55% | 89.68% | 6.51% | 83.2 | | | |
| 10 | 0.023956 | 0.048232 | 186 | 7424 | 7.00% | 10.59% | 96.69% | 17.10% | 79.6 | | | |
| 20 | 0.013745 | 0.023955 | 49 | 7228 | 1.84% | 10.31% | 98.53% | 27.40% | 71.1 | Level 1 Investigation | 60.46% | 0.62% |
| 30 | 0.008802 | 0.013745 | 18 | 7259 | 0.68% | 10.35% | 99.21% | 37.76% | 61.5 | | | |
| 40 | 0.005707 | 0.008802 | 6 | 7271 | 0.23% | 10.37% | 99.44% | 48.13% | 51.3 | | | |
| 50 | 0.003704 | 0.005707 | 8 | 7269 | 0.30% | 10.37% | 99.74% | 58.49% | 41.2 | | | |
| 60 | 0.002503 | 0.003704 | 4 | 7273 | 0.15% | 10.37% | 99.89% | 68.87% | 31 | | | |
| 70 | 0.00179 | 0.002503 | 1 | 7276 | 0.04% | 10.38% | 99.92% | 79.25% | 20.7 | | | |
| 80 | 0.00111 | 0.00179 | 2 | 7275 | 0.08% | 10.38% | 100.00% | 89.62% | 10.4 | Hibernate | 30.00% | 0.01% |
| 90 | 0.0000026 | 0.00111 | 0 | 7277 | 0.00% | 10.38% | 100.00% | 100.00% | 0 | | | |
| Totals | | | 2656 | 70114 | | | | | | | | |

FIG. 12

SYSTEM AND METHOD FOR PRIORITIZING CUSTOMER DATA

TECHNICAL FIELD OF THE INVENTION

The present invention relates generally to the processing of customer data, more specifically to the analysis and prioritization of tabular customer datasets.

BACKGROUND OF THE INVENTION

Machine learning (ML) models, for example Large Language Models (LLMs) are commonly trained by exposing them to large amounts of textual data and can exhibit remarkable capabilities in understanding semantic relationships within objects or items from text-based input. Thus, with the ability to understand customer queries, they can generate and provide a user with a discrete answer, e.g. to a specific question or prompt.

While LLMs excel with text-based data, customer datasets, e.g. customer data in contact centers or financial institutions, are commonly stored in databases in tabular or other forms. Simply replacing text-based input with tabular input may not be feasible and may not produce good ML output.

Given the abundance of tabular data in various industries, there is a need for a solution that allows for processing of tabular data by ML models.

SUMMARY OF THE INVENTION

Improvements and advantages of embodiments of the invention may include ML processing of tabular data for the purpose of prioritizing data, based on vectors generated from tabular data. Embodiments may more efficiently prioritize tabular customer data.

Embodiments of the invention may improve the technology of data analysis, by for example intelligently creating input to an artificial intelligence model, e.g. generating an analysis prompt, in order to, for example, prioritize customer data based on content of tabular datasets which are otherwise difficult for computerized processes to identify.

One embodiment may include a method of prioritizing customer data, the method including: using one or more customer datasets of tabular data to generate one or more analysis prompts; applying the one or more analysis prompts to a machine learning model to generate a vector for each customer dataset, wherein the vector includes a prioritization value; and generating a prioritization of the one or more customer datasets by comparing the prioritization value of the vector to threshold values.

In one embodiment, when the prioritization value of the vector lies above the threshold values, an alert is produced.

In one embodiment, when the prioritization value of the vector lies above the threshold values, a customer account linked to the vector is suspended.

In one embodiment, when the prioritization value of the vector is higher than the threshold values, the customer dataset is classed as high priority customer dataset; and when the prioritization value of the vector is lower than the threshold values, the customer dataset is classed as low priority customer dataset.

In one embodiment, the one or more datasets include data items selected from a group consisting of categorical data items and numerical data items.

In one embodiment, the vector undergoes principle component analysis.

In one embodiment, the one or more datasets of tabular data are converted into an open standard file format prior to the analysis prompt generation.

In one embodiment, the machine learning model is a large language model.

One embodiment includes the threshold values based on previously recorded datasets including customer datasets using machine learning.

One embodiment includes generating the prioritization by comparing a prioritization value of the vector with predicted vector values.

In one embodiment, one or more datasets of tabular data include data items for which previously predicted threshold values have been recorded.

One embodiment may include a system for prioritizing customer data, the system including: a computing device; a memory; and a processor, the processor configured to: use of one or more datasets of tabular customer data to generate one or more analysis prompts; apply the one or more analysis prompts to a machine learning model to generate a vector for each customer dataset, wherein the vector includes a prioritization value; and generate a prioritization of the one or more customer datasets by comparing the prioritization value of the vector to threshold values.

One embodiment may include a method of managing data, the method including: using a plurality of datasets of tabular data to create a plurality of analysis prompts; submitting the plurality of analysis prompts to a machine learning model to convert the plurality of analysis prompts into a vector for each customer dataset, wherein the vector includes a prioritization value; and comparing the prioritization values of the vector to threshold values to create a prioritization of the plurality of data sets.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts a flowchart of prioritizing customer data, according to some embodiments of the present invention.

FIG. 12 illustrates an example prioritization of customer data sets based on an alert system generated from comparison of a prioritization value of a vector with threshold values, according to some embodiments of the present invention.

Figure 1:
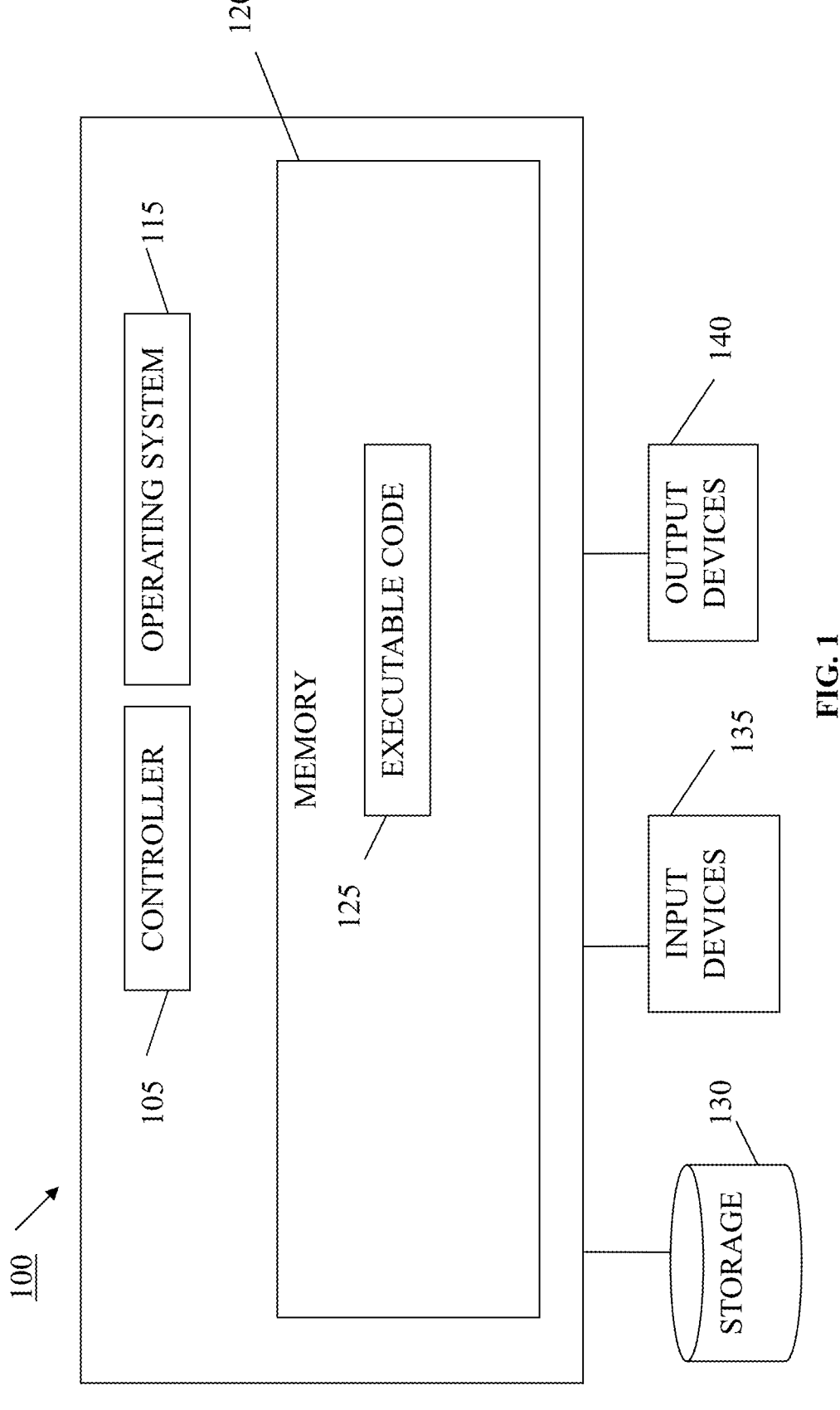
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "contact center" may refer to a centralized office used for receiving or transmitting a large volume of enquiries, communications, or interactions. For example, enquiries, communications, or interactions may be stored and/or processed in tabular form, e.g. in the form of spreadsheets, tables or databases. The enquiries, communications, or interactions may include telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, "interaction" may refer to a communication between two or more people (e.g., in the context of a contact center, an agent and a customer), typically via devices such as computers, customer devices, agent devices, etc., and may include, for example, voice telephone calls, conference calls, video recordings, face-to-face interactions (e.g., as recorded by a microphone or video camera), emails, web chats, SMS messages, etc. An interaction may be recorded to generate an "interaction recording". An interaction or interaction recording may also refer to the datasets which are distributed, transferred or stored in a computer system recording the interaction (for example the data stream distributed to an agent), and the datasets representing the interaction, including for example voice or video recordings, data items describing the interaction or the parties, a text-based transcript of the interaction, etc. Interactions as described herein may be "computer-based interactions", e.g., one or more voice telephone calls, conference calls, video recordings/streams of an interaction, face-to-face interactions (or recordings thereof), emails, web chats, SMS messages, etc. Some computer-based interactions may take place via the internet, such as some emails and web chats, whereas some computer-based interactions may take place via other networks, such as some telephone calls and SMS messages. An interaction may take place using text data, e.g., email, web chat, SMS, etc., or an interaction may not be text-based, e.g., voice telephone calls. Non-text-based interactions may be converted into text-based interaction recordings (e.g., using automatic speech recognition). For example customer datasets of interactions may be stored in tabular form.

As used herein, "user" may refer, for example, to a data analyst or investigator, who is reviewing data items of datasets, e.g. of transactions of customers. A data analyst may interact with a user and can submit customer datasets of tabular data, e.g. customer data sets X, Y and Z of customers A, B and C for which they would like to generate a prioritization of customer datasets by comparing a prioritization value of a vector generated from the datasets to threshold values.

A prioritization may be an ordering of customer data, e.g. customer datasets may be ordered based on a comparison of a prioritization value of a vector to threshold values. A vector may include values, e.g. a prioritization value indicating a fraudulent transaction of a customer. A ML model may be trained to compare a prioritization value with threshold values. For example, a vector for customer dataset A includes a prioritization value of 0.84 indicating a fraudulent transaction. A ML model may be trained to categorize the prioritization value, e.g. by comparison to threshold values such as 0-<0.3 indicating a low risk for a fraudulent transaction, 0.3-<0.9 indicating a medium risk for a fraudulent transaction and 0.9-1.0 indicating a high risk for a fraudulent transaction. A prioritization value of 0.84 may be higher than 0.3 but lower than 0.9 and customer dataset A may be assigned a medium risk for a fraudulent transaction. A vector for customer dataset B includes a prioritization value of 0.22 indicating a fraudulent transaction. A prioritization value of 0.22 is lower than 0.3 and customer dataset A may be assigned a low risk for a fraudulent transaction. As a result, customer dataset A having a medium risk for a fraudulent transaction may be prioritized over dataset B having a low risk for a fraudulent transaction. In some embodiments, when a prioritization value of a vector lies above a threshold, e.g. a vector for customer dataset C includes a prioritization value of 0.92 and comparison with a threshold value for indicates a high risk for a fraudulent transaction, an alert may be produced, e.g. a notification to a user, e.g. an investigator using computing device 210 may be produced alerting a user of a dataset for which a high risk for a fraudulent transaction was determined. In some embodiments, only one threshold value is used for comparing a prioritization value and a comparison leads to a prioritization in the form of a binary output, e.g. a dataset may be prioritized if a prioritization value is higher than a threshold value and a dataset may not be prioritized if a prioritization value is lower than a threshold value.

A prioritization of a dataset may be generated by comparing one prioritization value of a generated vector to one threshold value. For example, a prioritization may be generated by comparison of a prioritization value indicating a risk for a fraudulent transaction to a threshold value indicating a risk for a fraudulent transaction.

As used herein, "customer" may refer to a customer submitting datasets, e.g. datasets of transactions, e.g. money transfers to another customer. Datasets may include data items of 0, 1, 2, 3 or more data items. A data item may be an attribute of a customer, e.g. a customer identifier, a tax identifier of a customer, or a customer address.

As used herein, a "prioritization value" may refer, for example, to a value within a generated vector which may allow comparing of a dataset to a threshold value, e.g. to generate a prioritization of one or more customer data sets. For example, a dataset A with a prioritization value of 0.8 may be higher than a threshold value for prioritization of 0.5 and data set A may be prioritized, e.g. it may be assigned to an agent earlier than a data set B having a prioritization value of 0.2 which lies below a threshold value for prioritization of 0.5.

As used herein, "tabular" may refer, for example, to data, e.g. in the form of datasets which include data items, which can be stored or organized in a table, e.g. a database or spreadsheet. Tabular data, e.g. in the form of datasets and data items, may be arranged in rows and columns, e.g. as in a matrix. For example, each row may represent a dataset including one or more data items.

As used herein, "analysis prompt" may refer to a prompt, typically in the form of a text string (but which may be in another format) which is used in instructing a machine learning (ML) model to generate an output, e.g. in the form of a vector for an analysis prompt generated from one or more customer datasets of tabular data.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms. In a supervised ML approach, input sample data may include data which is labeled, for example, in the present application, the input sample data may include data which has been extracted from a database, table or any form of tabular storage. In an unsupervised ML approach, the input sample data may not include any labels, for example, in the present application, the input sample data may include datasets of tabular data only.

ML models may, for example, include Large Language Models (LLM) such as Generative Pre-Trained Transformer (GPT), Bidirectional Encoder Representations from Transformers (BERT), Pathways Language Model (PaLM) and the like, (artificial) neural networks (NN), decision trees, regression analysis, Bayesian networks, Gaussian networks, genetic processes, etc. Additionally or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

In practice, an LLM or NN, or NN learning, can be simulated by one or more computing nodes or cores, such as generic central processing units (CPUs, e.g., as embodied in personal computers) or graphics processing units (GPUs such as provided by Nvidia Corporation), which can be connected by a data network. A NN can be modelled as an abstract mathematical object and translated physically to CPU or GPU as for example a sequence of matrix operations where entries in the matrix represent neurons (e.g., artificial neurons connected by edges or links) and matrix functions represent functions of the NN.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

An input to a NN model such as ChatGPT may describe an entity or person, and instead of using an output of a model, an embodiment may extract (e.g. using a get_embedding function) activations from an internal NN layer to obtain an embedding, such as a vector (e.g. an ordered list of numbers), which may provide a representation of the input useful in some embodiments.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. embedding model 610, large language model 918, and modules in FIGS. 2, 3, 4, 5, 6, 9, 11, and 13 may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3 or other figures, or other methods, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB)

device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
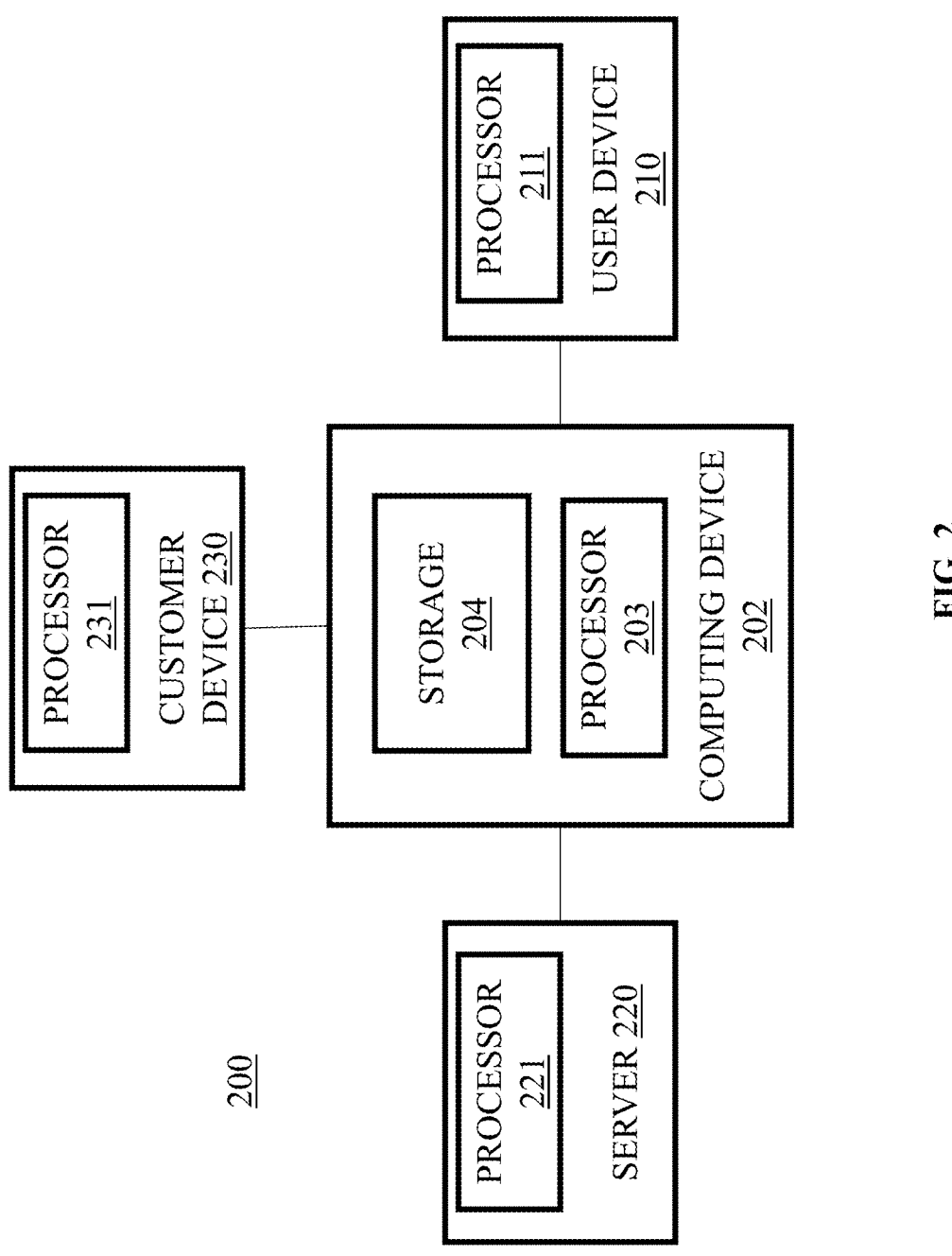
FIG. 2 is a schematic drawing of a system for prioritizing customer data, according to some embodiments of the invention.

FIG. 2 is a schematic drawing of a system 200 according to some embodiments of the invention. System 200 may include a computing device 202 including a processor 203 and storage 204. Computing device 202 may be connected to a user device 210 that includes processor 211. Computing device 202 may be connected to a server 220 including processor 221. Computing device 202 may be connected to a customer device 230 including processor 231. Server 220 and user device 210 may provide computing device 202 with customer datasets. Alternatively, customer datasets may be stored in storage 204 of computing device 202.

Computing devices 100, 202, 210, 220 and 230 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 100, 202, 210, 220 and 230 may include one or more input devices, for receiving input from a user (e.g., via a pointing device, click-wheel or mouse, keys, touch screen, recorder/microphone, or other input components). Computers 100, 202, 210, 220 and 230 may include one or more output devices (e.g., a monitor, screen, or speaker) for displaying or conveying data to a user.

Any computing devices of FIGS. 1 and 2 (e.g., 100, 202, 210, 220 and 230), or their constituent parts, may be configured to carry out any embodiment of the present invention. Any computing devices of FIGS. 1 and 2, or their constituent parts, may include machine learning model 408, embedding model 610 or LLM 918, or another engine or module, which may be configured to perform some or all of the methods of the present invention. Systems and methods of the present invention may be incorporated into or form part of a larger platform or a system/ecosystem, such as agent management platforms. The platform, system, or ecosystem may be run using the computing devices of FIGS. 1 and 2, or their constituent parts. A processor such as processor 203 of computing device 202 processor 211 of device 210, and/or processor 221 of computing device 220 may be configured to use one or more customer datasets of tabular data to generate one or more analysis prompts. For example, datasets may include datasets which include personal information of a customer, e.g. data items such as postal addresses, banking information, or tax identification or any form of data related to transactions or used in online banking. An analysis prompt may be a prompt that can serve as an input for a machine learning model, e.g. a large language model. A processor such as processor 203 of computing device 202 processor 211 of device 210, and/or processor 221 of computing device 220 may be configured to apply one or more analysis prompts to a machine learning model to generate a vector for each customer dataset, wherein the vector includes a prioritization value. For example, an analysis prompt may include input in the form of a text, e.g. sentences describing content of a table or database, e.g. "customer A has initiated transaction X on 29 Apr. 2024" (which may be converted from a table or database), and a machine learning model may generate an output in the form of a vector, e.g. vector "0.61 0.29 0.31. A processor such as processor 203 of computing device 202 processor 211 of device 210, and/or processor 221 of computing device 220 may be configured to generate a prioritization of the one or more customer datasets by comparing a prioritization value of the vector to threshold values. For example, a prioritization value of a vector, e.g. vector "0.61 0.29 0.31" may be compared to threshold values to generate a prioritization. For example, when a dataset A includes a prioritization value 0.79 in a vector representing a likelihood of a fraudulent transaction, an dataset B includes a prioritization value 0.34 in a vector representing a fraudulent transaction, and a threshold value for prioritizing a review of a fraudulent transaction may be 0.5, dataset A with a vector prioritization value 0.79 may lie above the threshold for prioritizing a review of a fraudulent transaction and may be prioritized in a review process whereas dataset B having a vector prioritization value of 0.34 may not be prioritized in a review process. For example, dataset a with a vector prioritization value of 0.79 lying above a threshold value of 0.50 may produce an alert, e.g. an alert instructing an immediate review of dataset A by a user, e.g. an investigator using computing device 210.

FIG. 3 shows a flowchart of a method 300 of prioritizing customer data, e.g. customer datasets of a customer including data items such as name, postal address, bank details of a customer. In an example, method 300 may be used to automatically manage data sets of customer data, e.g. customer data of financial transactions. As an example for a practical use, customer datasets e.g. a number of datasets including transaction requests, may be applied to a machine learning model to generate a prioritization of datasets which allows ordering such customer datasets for action such as a review based on their risk of being a fraudulent transaction and producing an alert for datasets which may require a review by an investigator prior to conducting a transaction. Datasets of customer data may be stored in a database and/or may be received from storage of a computing device, e.g. user device 210, customer device 230, or computing device 202. The system displayed in FIG. 2 and the method shown in FIG. 3 may refer to the generation of an analysis prompt used to produce an output from the machine learning model of a vector for each customer dataset, wherein the vector includes a prioritization value, and prioritization of customer data based on a prioritization value within the vector or generated from the vector values. Comparison of a generated vector prioritization value which has been received from a user device, e.g. 210, a database, e.g. server 220, or customer device 230, or any other device and threshold values, e.g. generated by a trained ML model may produce an alert when a prioritization value of a vector lie above a threshold value and may not produce an alert when a prioritization value of a vector lie below a threshold value. According to some embodiments, some or all of the steps of the method are performed (e.g., fully or partially) by one or more of the computational components, for example, those shown in FIGS. 1 and 2.

In operation 302, one or more customer datasets of tabular data may be used to generate one or more analysis prompts. One or more datasets may include data items selected from categorical data items, e.g. customer addresses, and numerical data items, e.g. transaction amounts such as $100 or account balance £20,000. One or more datasets of tabular data may be converted into an open standard file format prior to analysis prompt generation. Open standard file format may be file formats for storing digital data which exhibit an openly published specification. Open standard file formats may include, but are not limited to, for example JavaScript Object Notation (JSON) or HyperText Markup Language (HTML) and can be used and implemented freely with an open license. For example, a plurality of datasets of tabular data may be used to create a plurality of analysis prompts. One or more customer datasets of tabular data may be used in the generation of a prompt, e.g. prompt 406, which is applied to a machine learning model, e.g. model 408 shown in FIG. 4. An analysis prompt may be, for example, a prompt which includes a plurality of customer data items and is applied to generate a prioritization which may be an order of priority of a plurality of datasets of one or more customers. For example, datasets may be ordered in their priority (e.g. prioritized) based on a risk to involve a fraudulent transaction, a due date for a transaction, etc.

Datasets used in the prioritization of customer data may be retrieved in tabular form, e.g. from databases or spread sheets, or may be extracted from interaction transcripts. For example, a dataset in tabular form retrieved from a contact center may include information describing a customer such as customer name, address, bank details, telephone number.

In operation 304, one or more analysis prompts may be applied or input to a machine learning model to generate a vector for each customer dataset, wherein the vector includes a prioritization value. A machine learning model may be a large language model, e.g. ChatGPT by OpenAI, or another type of model. A vector can undergo principal component analysis. For example, a plurality of analysis prompts may be submitted or input to a machine learning model, where the machine learning model may convert the plurality of analysis prompts into a vector for each customer dataset, and output the vector. A vector can be a data structure which is used to store values. Within a vector, values may be ordered in a dynamic array. A data structure in the form of a vector can be resized, e.g. reduced in their size using principal component analysis (PCA). PCA may allow identifying principal components of a collection of vector values, e.g. to identify vector values which show the largest variation within a vector. In a principal component analysis, a vector may be reduced to principal components, e.g. essential vector values. Principal components may be a few linear combinations of vector values that maximally explain the variance of all the vector values. For example, a vector X may include vector values that represent five data items such as name, address, customer satisfaction, customer age and occupation for five customers A, B, C, D, E and F leading to a vector having five columns and five rows. In case that prioritization of datasets for customers A, B, C, D and E may be generated by comparison of a prioritization value for customer satisfaction, vector values for customer age and occupation may not be needed for generating a prioritization. A PCA may reduce vector X to three columns of data items name, address and customer satisfaction for customers A, B, C, D and E and may delete columns for age and occupation. Reduction of a vector size to vector values which are used in the comparison of vector values to threshold values may result in an increased processing speed of a computing device in the generation of a prioritization.

In operation 304, a prioritization of one or more customer datasets may be generated by comparing a prioritization value of a vector to threshold values. A prioritization may be generated by comparing a prioritization value of a vector with predicted vector values. One or more datasets of tabular data may include data items which can allow classification or prediction of a priority of a dataset, e.g. by comparing a prioritization value of a vector for each dataset to threshold values. For example, when a prioritization value of a vector is higher than the threshold values, a customer dataset may be classed as a high priority customer dataset. In another example, when a prioritization value of the vector is lower than the threshold values, a customer dataset may be classed as a low priority customer dataset. For example, prioritization vector values of a vector may be compared to threshold values to create a prioritization of a plurality of data sets.

In case that a prioritization value of the vector lies above the threshold values, an alert may be produced. For example, when a prioritization value of a vector lies above threshold values, a customer account linked to a vector may be suspended.

A machine learning model used in the application of an analysis prompt may be, for example, a large language model such as Chat GPT 4 LLM model by Open AI.

Operations 302 and 304 may be performed for one dataset at a time, but may also be performed for several datasets at the same time, e.g. concurrently in parallel. Initiation of operations 302 and 304 may occur periodically, e.g. identifying data connections may proceed every hour, every date, every month or may occur when a fraudulent dataset is detected, e.g. a dataset has been found being part in a data breach.

Figure 4:
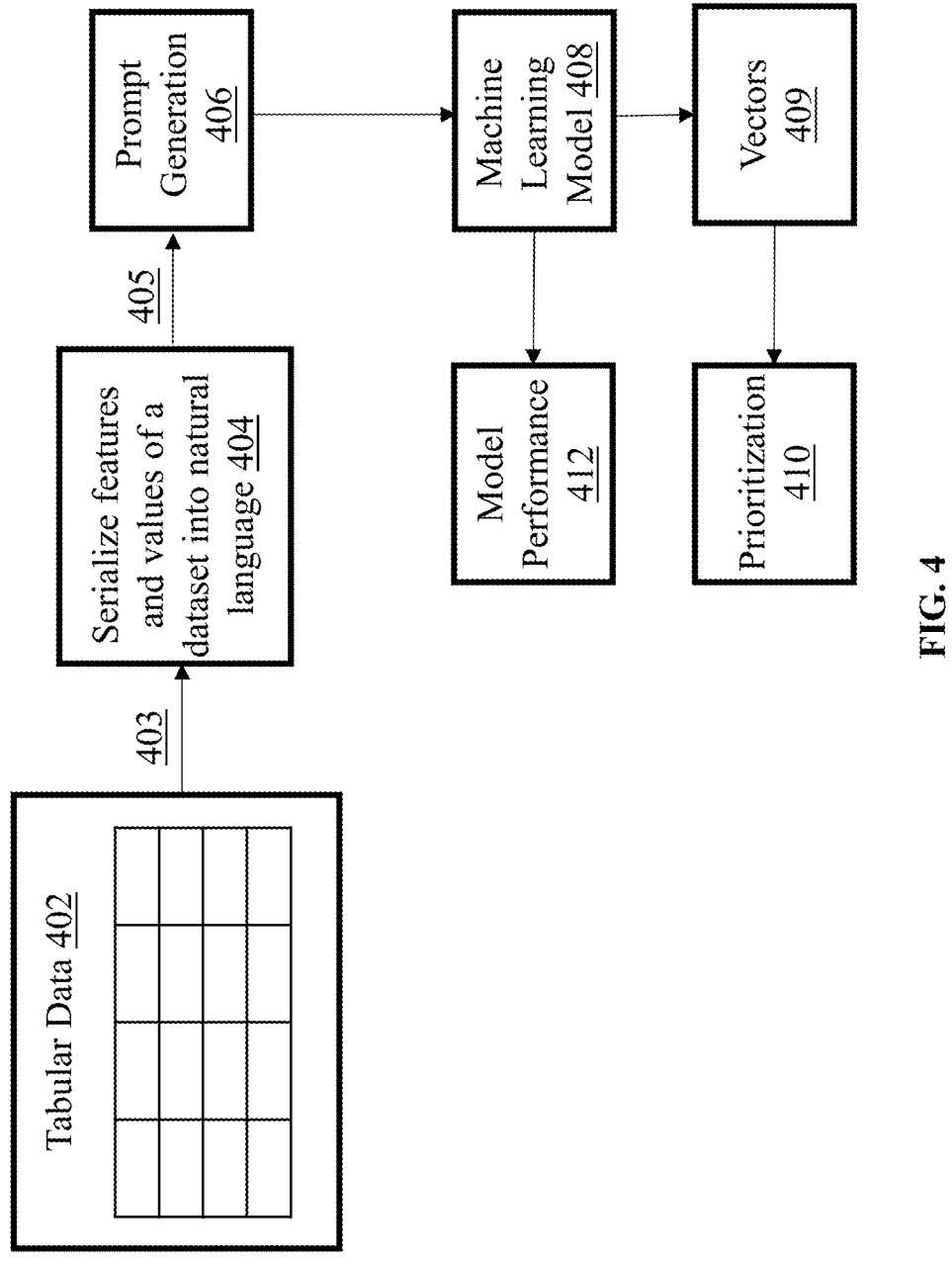
FIG. 4 is an illustration of operations in the prioritization of customer data, according to some embodiments of the present invention.

FIG. 4 is an illustration of operations in the prioritization of customer data. In operation 403, tabular data 402, e.g. one or more datasets of tabular data may be used to generate one or more analysis prompts 406. For example, for each dataset of tabular data, one analysis prompt may be generated. In the generation of an analysis prompt 406, one or more customer datasets of tabular data may be converted into a natural language 404 format, e.g. into a narrative, which can be transmitted to an LLM (operation 405). An ML model, e.g. a LLM 408, may input the converted data and may generate as output a vector for one or more analysis prompts, e.g. to create a tabular row embedding e.g. a vector representation.

In some cases, a PCA can be applied to transformed datasets, e.g. to reduce the number of variables/dimensions prior to the application of a ML model, e.g. to enhance the efficiency in the generation of a vector. Output by a machine learning model 408 may be assessed, e.g. by a model performance service 412. Generated vector 409 may be used in the prioritization 410 of customer data sets, e.g. by comparing a prioritization value of vector 409 to threshold values. For example, a vector of a customer data set may include a prioritization value which indicate an alert score. An alert score may allow a prediction of whether or not a dataset requires investigation of a dataset by a user, e.g. an investigator using computing device 210. For example, in case that an alert score is higher than a threshold value set in the training of a ML model, e.g. having a prioritization value of 0.89, a dataset may be prioritized, e.g. leading to an action such as investigation of a customer dataset by a user, in case that an alert score is between 0.80 and 0.89, an investigation of a customer dataset may be optional, and if an alert score is between 0 and 0.80, no alert may be raised and a customer data set may not be investigated. In data collection operation 403, one or more customer datasets of tabular data 402, e.g. datasets of transactions carried out by a customer using customer device 230 may be received by a computing device 202 or user device 210. Tabular data may include data items which are categorical data items (which may describe target entities based on membership in a category, or a description by one of a finite descriptors), e.g. or numerical data items (e.g. descriptive data where a certain description, such as age, is categorized by a number, e.g. 25 years old), e.g. Table 1 includes an example dataset which includes categorical data items (e.g. stored in datatypes such as object, float64) such as loan intent setting a reason for a loan, and numerical data items (e.g. stored in datatypes such as int64) such as person age setting an age of a customer. Data items other than categorical and numerical may be used.

Datasets may be stored in a database, e.g. a database stored in storage 204 of computing device 202, and may be retrieved, e.g. using a data extractor service executed by computing device 202.

TABLE 1

| Data item | Column | Non-Null Count | datatype |
|---|---|---|---|
| 0 | person_age | 1740 non-null | int64 |
| 1 | person_income | 1740 non-null | int64 |
| 2 | person_home_ownership | 1740 non-null | object |
| 3 | person_emp_length | 1740 non-null | float64 |
| 4 | loan_intent | 1740 non-null | object |
| 5 | loan_grade | 1740 non-null | object |
| 6 | loan_amnt | 1740 non-null | int64 |
| 7 | loan_int_rate | 1740 non-null | float64 |
| 8 | loan_status | 1740 non-null | int64 |
| 9 | loan_percent_income | 1740 non-null | float64 |
| 10 | cb_person_default_on_file | 1740 non-null | object |
| 11 | cb_person_cred_hist_length | 1740 non-null | int64 |

In operation 403, datasets may be transformed into natural language 404, e.g. a narrative. Tabular data may be converted into natural language using an application, e.g. a Python-based application in combination with a ML model. For example, a narrative may be generated using ChatGPT by OpenAI Inc. A conversion function within a prompt "convert_to_narrative" may generate a dictionary of categories for input values containing tabular data and may convert tabular data into natural language, e.g. a narrative. For example, a ML model may identify a category "person age" which relates to the age of a customer and may link a corresponding value of a dataset for a customer, e.g. "22" to the category "person age". Since a ML model, e.g. model 408, may require input in the form of a prompt, e.g. in the form of a coherent text, each dataset may be transformed into natural language. Direct conversion of tabular data into a prompt can lead to ambiguous results in the generation of a vector. Thus, in some embodiments, conversion of tabular data into a dataset can proceed via conversion of tabular data into a format such as a json format and subsequent json formatted datasets into a natural language 404 which is used in the prompt generation 406.

For example, raw data extracted from one customer dataset of tabular data may read:

{'person_age': 22, 'person_income': 70000, 'person_home_ownership': 'RENT', 'person_emp_length': 4.0, 'loan_intent': 'EDUCATION', 'loan_grade': 'C', 'loan_amnt':

27500, 'loan_int_rate': 13.06, 'loan_percent_income': 0.39, 'cb_person_default_on_file': 'Y', 'cb_person_cred_hist_length': 3}

An example for input to a ML model in the form of a prompt may read:

import openai #Replace 'your-api-key' with your actual OpenAI API key openai.api_key='your-api-key' def convert_to_narrative (data):

prompt=f" " " Please convert the following tabular data into a narrative:

Input:

Person Age: 22

Person Income: 70000.

Person Home Ownership: RENT.

Person Employment Length: 4.0

Loan Intent: EDUCATION

Loan Grade: C.

Loan Amount: 27500.

Loan Interest Rate: 13.06.

Loan Percent Income: 0.39.

Credit Bureau Person Default on File: Y.

Credit Bureau Person Credit History Length: 3

An example for an output format of a ML model in response to a submitted prompt may read:

A {data ['person_age']}-year-old individual with an annual income of $ {data ['person_income']} who currently {data ['person_home_ownership'].lower ( ) a home and has been employed for {data ['person_emp_length']} years. This person intends to use the loan for {data ['loan_intent'].lower ( ) and has been assigned a loan grade of {data ['loan_grade']}. They are seeking a loan amount of $ {data ['loan_amnt']} with an interest rate of {data ['loan_int_rate']} %. The requested loan represents {data ['loan_percent_income'] *100} % of their income. Additionally, the individual's credit file shows a default C'{data ['cb_person_default_on_file']}') and a credit history length of {data ['cb_person_cred_hist_length']} years.

```
""""
response = openai.Completion.create(
engine="text-davinci-003", # or use "gpt-3.5-turbo" if you prefer that
model
prompt=prompt,
max_tokens=250
)
narrative = response.choices[0].text.strip( )
return narrative
```

As shown in the example output format, an application programming interface such as provided by OpenAI may be used to generate a text completion in the form of a narrative. An openai.Completion.create function or other suitable function may be used with a text completion model (e.g. "text-davinci-003" or "gpt-3.5-turbo"), a prompt, and a token limit, e.g. a maximum token limit of 250 tokens. A response may be stored in a response variable, and a text generated by the ML model may be extracted, e.g. from a first choice of a response and trimmed of any leading or trailing whitespace. This text may then be returned as a narrative in natural language, e.g. a narrative for a response variable such as a variable person_income present in a customer datasets of tabular data, e.g. as shown in Table 1.

For example, output by a ML of a customer dataset of raw data transformed into natural language may read:

"The person is 22 years old, with an income of $70,000, and they rent their home. They have been employed for 4 years. The loan they are applying for is for education purposes, with a grade of C. The loan amount is $27,500 with an interest rate of 13.06%. The loan represents 39% of their income. They have a default record on file and their credit history is 3 years."

In operation 408, a vector may be generated from one or more analysis prompts by applying the analysis prompts to a machine learning model. Vector 409 may be stored in a vector database and represent textual data into a numerical format.

An excerpt of example programming code may read:

```
def get_embedding(text_to_embed):
    # Embed a line of Narrative
    response = openai.Embedding.create(
    model= "text-embedding-ada-002",
    input=[text_to_embed]
    )
    # Extract the AI output embedding as a list of floats
    embedding = response["data"][0]["embedding"]
    return embedding
```

The above example programming code excerpt may lead to applying an analysis prompt as an input to a ML model to generate a vector 409. Function get_embedding may generate a vector representation of a given input, e.g. an embedding for a given text, e.g. in natural language, using for example an OpenAI text embedding model, e.g. Open AI's text-embedding-ada-002 model, or another suitable model. The function may initiate an openai.Embedding.create method with the specified model and input text, may extract and return an embedding from the response in form of a vector, e.g. a vector for each dataset. An embedding may be a list of floats representing an encoded form of an input text, e.g. a narrative in natural language. An extraction of a vector using a get_embedding function may include retrieving activations from an internal NN layer, e.g. a NN layer of an Open AI ChatGPT model layer in form of a vector (e.g. an ordered list of numbers), which may provide a representation of an input (e.g. an input in form of a narrative or textual representation). Different code and different languages may be used.

For example, an OpenAI application may use an analysis prompt as an input for a pre-trained language model called "text-embedding-ada-002". An embedding model of an LLM, e.g. ChatGPT by OpenAI Inc., may return or output a response object, in the form of a vector, e.g. an embedded representation of an input prompt in the form of a list of floating point values. A data extractor service executed by computing device 202 may extract the embedding from the response object and output in the form of a vector.

Overall, this programming code excerpt may act as a simple wrapper around a ML application, e.g. OpenAI, for text embedding, allowing users to easily embed text using any pre-trained language model, e.g. a large language model.

A vector may be generated from an analysis prompt which may include narrative of tabular data using pre-trained LLM model.

An excerpt of an example output of a vector is shown below:

15
16 starting embedding 0
[−0.014714154414832592,−0.0023064371198415756,
0.018150942400097847,−0.05012743920087814,
0.004531201906502247,−0.0132113
76965045929,−0.024410339072346687,
0.01400850247591734,−0.0368768610060215,−
0.026475023478269577, 0.006563218776136637,
0.021744541823863983,−0.011499516665935516,−
0.009826860390603542,−0.0019193085609003901,
0.016582826152443886, 0.01949690
0.03719048202037811,−0.006769034080207348,−
0.0017641304293647408,−0.022097367779332161,
0.015119251795113087,−0.002105522
841138363,−0.02914082072675228,
0.021025821566581726,−0.02830449305474758,−
0.035857584327459335, 0.0035478624049574137,
435158491, 0.012786678969860077,−
0.016556691378355026, 0.02383536286652088,−
0.009911799803376198,−0.0126233333372175694,
0.011989553458988667,−0.034289468079805374,−
0.001565665821544826,−0.01673963852226734,
0.012440386228263378, 0.0086050359
53223705,−0.010310362093150616,
0.022371787577867508,−0.0030398580711334944,−
0.0072329347021877766,−0.01494937203824520

A size of a vector can vary depending on the used LLM, e.g. a vectorial size may be around 1,500 values.

Figure 5:
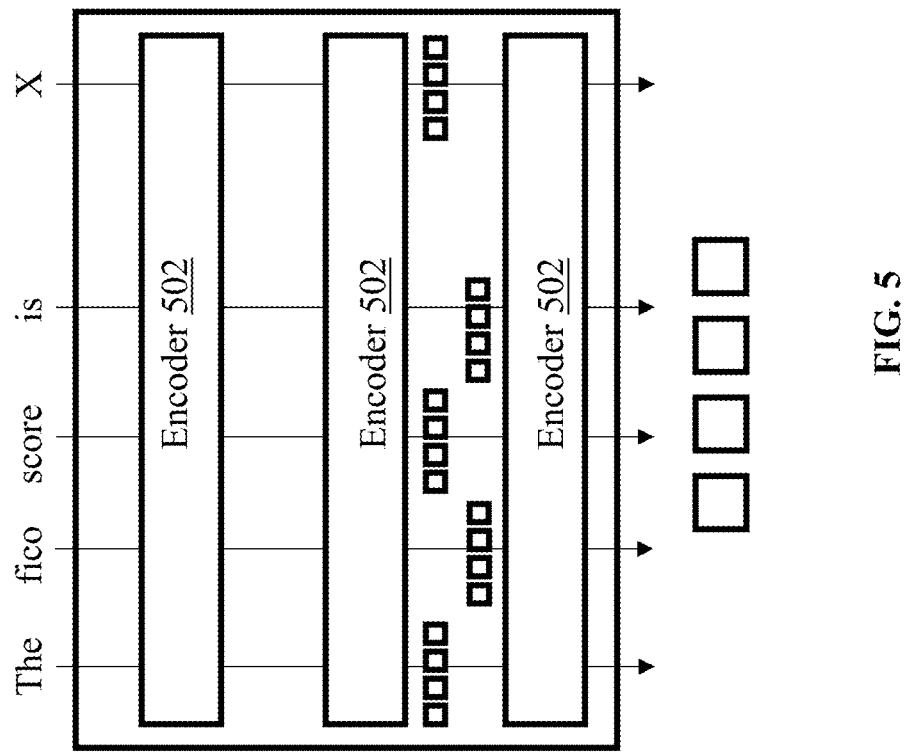
FIG. 5 illustrates a vectorization of tabular data, according to some embodiments of the present invention.

FIG. 5 illustrates a vectorization of tabular data. For example, a data item present in a tabular dataset may include a fico score of 578.0. The tabular dataset may be converted into natural language, e.g. a tabular dataset converted into natural language may read "The fico score is 578.0. The loan_amount is 6000.0. The term is 36 months. The annual_income is 35527.0. The state is CA." A tabular dataset converted into natural language may be used in the generation of an analysis prompt. An encoder service, e.g. encoder 502, may use a generated analysis prompt to vectorize each data item from a natural language expression of a tabular data item, e.g. natural language such as "The fico score is 578.0" into a vector, e.g. vector 409 shown in FIG. 4.

Figure 6:
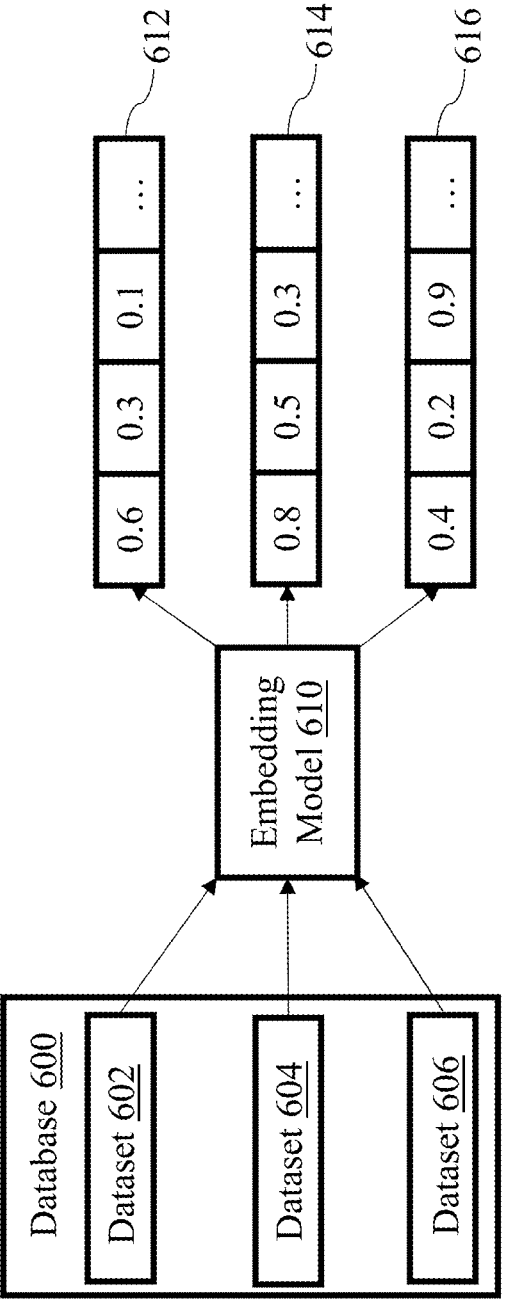
FIG. 6 illustrates a vectorization of tabular data, according to some embodiments of the present invention.

FIG. 6 illustrates a vectorization of tabular data. A dataset of tabular data may include data items in the form of columns of numeric values or values that can be translated into them (ordinal, categorical, etc.). In some cases, a dataset may include data items in the form of a textual representation, e.g. an interaction transcript of an interaction between a customer and an agent. A database, e.g. database 600, may include datasets 602, 604 and 606. A machine learning model, e.g. embedding model 610, may generate for each of datasets 602, 604 and 606 vectors 612, 614 and 616. Vectors 612, 614 and 616 may have a number vector values, e.g. scalars. For example vector 612 may include values 0.6, 0.3 and 0.1, vector 614 may include values 0.8, 0.5 and 0.3 and vector 616 may include vectors 0.4, 02 and 0.9.

Figure 7:
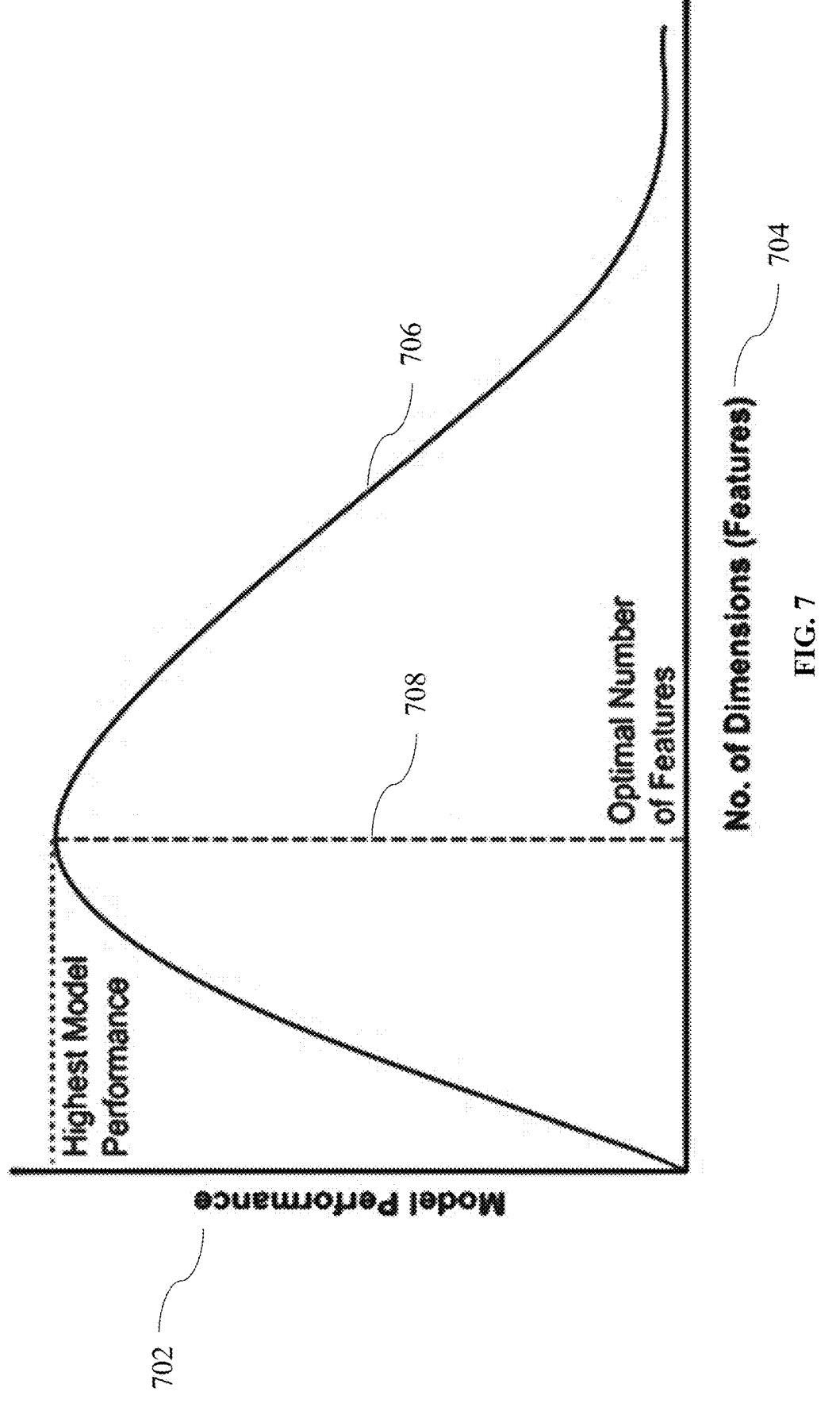
FIG. 7 is an illustration of a relationship between model performance and number of dimensions in a principle component analysis, according to some embodiments of the present invention.

FIG. 7 is an illustration of a relationship between model performance and number of dimensions in a principal performance analysis.

Principal Component analysis (PCA) is a dimensionality reduction method that can be used to reduce the dimensionality of large data sets, by transforming a large dataset including a large number of data items into a smaller one that still contains most of the information in the large dataset. In FIG. 7, the performance of LLM model 702 is shown in light of the number of dimensions 704, e.g. data items of a dataset, e.g. dataset 600. Curve 706 illustrates an example finding that a highest performance of an LLM model may be correlated to an optimal number of data items. E.g. as shown in FIG. 7, highest model performance may be achieved for an optimal number of data items 708. Lower and higher numbers of data items can result in lower ML model performances. For example, if a dataset includes 1500 data items, PCA may be used to reduce the number of data items to e.g. 50. While reducing the number of dimensions, PCA can ensure that maximum information of an original dataset is retained in a dataset with the reduced number of data items and the co-relation between the newly obtained Principal Components is minimum.

An excerpt of an example programming code for the performance of a PCA may read:

```
#Applying PCA
#Taking no. of Principal Components as 3
pca = PCA(n_components = 48)
pca.fit(scaled_embed)
embed_pca = pca.transform(scaled_ embed)
embed_pca = pd.DataFrame(embed_pca,columns=['PC1','PC2','PC3'])
embed_pca.head( )
```

The example programming code excerpt may lead to performing a PCA on a vector 409, e.g. an embedding from an output of a ML model generated by applying an analysis prompt including a get_embedding function to a given text, e.g. in natural language. A PCA may be executed on a vectorial representation of a dataset, e.g. a scaled dataset "scaled_embed":

In a first operation of a PCA, a PCA class from the 'sklearn.decomposition' module may be imported. In a second operation of a PCA, components for a PCA may be set. The number of components may be the number of principal components to which a vector, e.g. vector 409, may be reduced. For example, the number of components may be set to 48 principal components: pca=PCA (n_components=48). In a third operation, a PCT model may be fitted to scaled data: pca.fit (scaled_embed). In a fourth operation, a dimensionality reduction may be applied, e.g. to convert a vectorial representation, e.g. an embedding represented by vector 409, into a new principal component representation: embed_pca=pca.transform (scaled_embed). In a fifth operation, a representation of a selected, reduced number of components, e.g. three components may be created: embed_pca=pd.DataFrame (embed_pca, columns=['PC1', 'PC2', 'PC3']). A principal component representation of a vector may have the form of a vectorial representation but with a reduced number of variables compared to the vectorial representation, e.g. compared to the vectorial representation 409 prior to the PCA.

Figure 8:
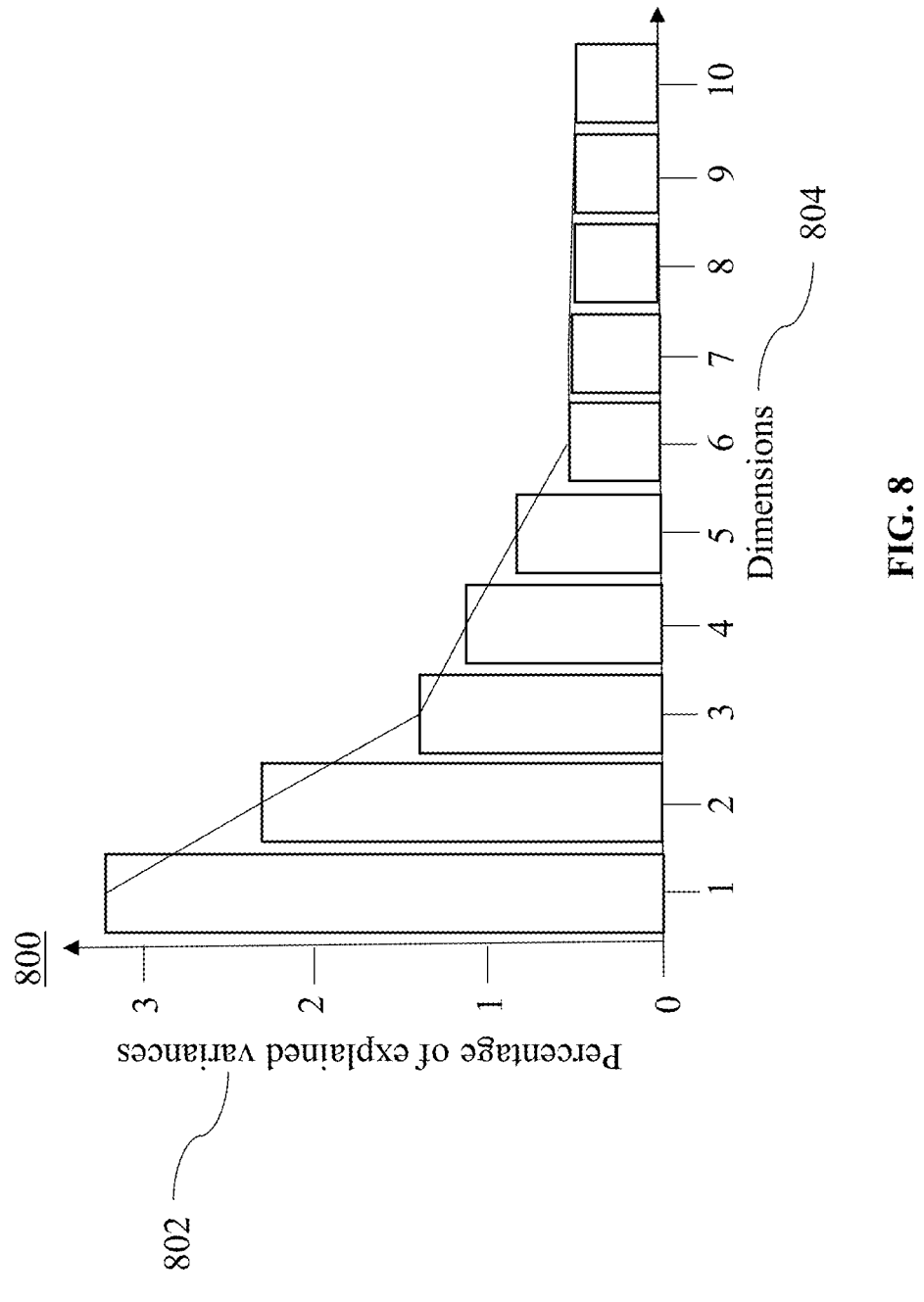
FIG. 8 illustrates a selection of principal components in the generation of a prioritization of customer datasets, according to some embodiments of the present invention.

FIG. 8 illustrates a selection of principal components in the generation of a prioritization of customer datasets 800. After applying PCA, data items, e.g. dimensions 804, may be selected by an LLM according to the percentage of explained variances 802. For example, data items which may show a high number of variances may be selected, e.g. to select 48 data items after performance of a PCA to be applied in a machine learning model to generate a vector.

Figure 9:
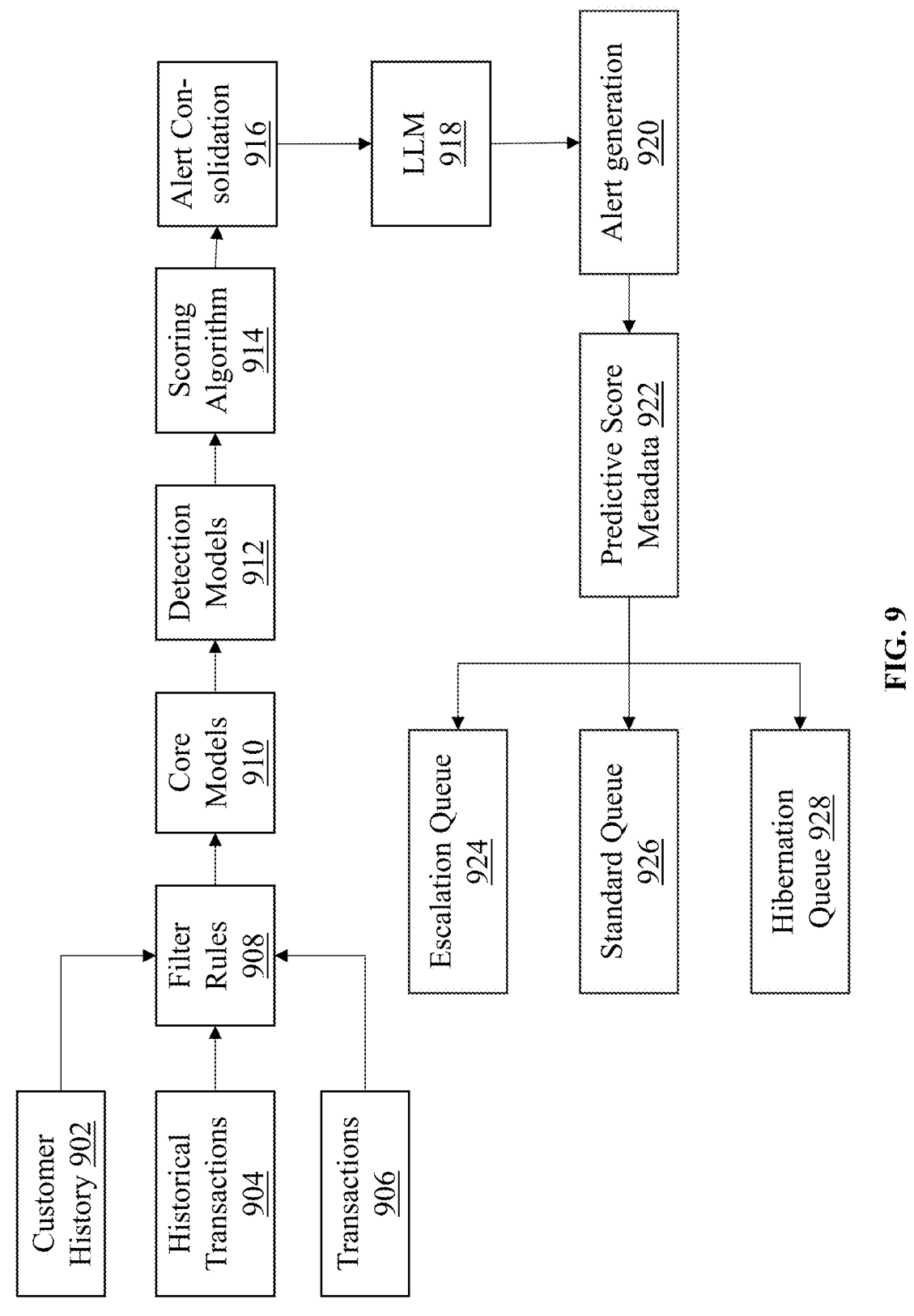
FIG. 9 illustrates generation of a ML model for the generation of a vector, according to some embodiments of the present invention.

FIG. 9 illustrates a generation of the predictive ML model for the generation of a vector.

Customer datasets, e.g. retrieved from customer history 902, e.g. previous information on a customer such as contact addresses, phone number, bank details, etc., historical transactions 904, e.g. receipts for transaction) and transactions 906, e.g. ongoing transactions, may be applied to filter rules 908. Filter rules may be rules that are applied to customer datasets, e.g. transactions, to select a specific group of customer datasets, for example a filter rule may be "card transaction" to filter all customer datasets which include card transactions. For example, a filter rule may be "cash transaction" to filter all customer datasets which include cash transactions. Filter all customer datasets may include removing certain datasets and leave remaining datasets, e.g. datasets that fulfil a filter condition.

A ML model, e.g. LLM model 918, may retrieve rules which are based on previous customer datasets and may generate a scoring algorithm 914. For example, datasets may include static and transactional data for customers, e.g. customer using computing device 230.

Core model and detection model may be used to select data items or datasets which include data items to train a ML model, to prioritize customer datasets. For example, a core model may be used to identify or filter specific types of transactions such as withdrawal transactions in which money is removed from a customer account and deposit transaction in which money is added to a customer account. A detection model may identify values, e.g. values in databases such as transaction amounts, customer names, account numbers, etc.

Scoring algorithm 914 may include threshold values which can be used in the generation of a prioritization of customer data sets, by comparing a prioritization value of a vector to threshold values. A scoring algorithm may generate a single vector value, also referred herein as a prioritization value, for a vector from multiple vector values.

A ML model, e.g. LLM model 918, may be trained, e.g. using training customer datasets, to detect a prioritization value of a vector for specific data items of datasets, e.g. an account status of a customer account such as active or inactive or suspended, and to prioritize datasets by comparing values of a vector to threshold values.

For example, a ML model may be trained to prioritize customer datasets based on comparison of vector values of scalar for a prioritization value "account activity". For example, a suspended account may be prioritized over an active account over an inactive account status. A suspended customer account may have a threshold value "account activity" of >0.9, an active customer account may have a threshold value "account activity" of 0.7-0.9 and an inactive account may have a threshold value "account activity" of 0.0-<0.7. Accordingly, when a generated vector for customer X includes a generated prioritization value "account activity" of 0.85, comparison to an ML model with trained account values may indicate that customer data X falls within a threshold of 0.7-0.9 and may indicate that customer data X belongs to an active account. A generated prioritization value "account activity" of customer Y may have a prioritization value of 0.42. Thus, comparison of a prioritization values for "account activity" for customer X and Y may generate a prioritization of customer X over customer Y since a prioritization value of 0.85 is greater than a prioritization value of 0.42.

For example, output of a ML model, e.g. LLM 918, may be categorized into one of three different prioritization levels for further processing, e.g. based on comparison of a prioritization value to threshold values, e.g. predictive score metadata 922.

For each customer dataset, after vectorization of customer datasets of tabular data, a prioritization value generated by LLM 918 may be compared to threshold values, e.g. predictive score metadata 922 used in the training of ML model 918. In some instances, when a prioritization value is above a threshold value, an alert, e.g. alert 920, may be produced.

FIG. 9 illustrates how alerts may be divided into three different types of alerts, e.g. escalation queue 924, standard queue 926 and hibernation queue 928. Classed alerts may be sent to a user, e.g. an alert investigator for further investigation. For example, comparison of a prioritization value and threshold values may allow arranging corresponding customer datasets in descending order of vector values. For example, alerts associated with a high prioritization value, e.g. 0.9, may be sent to user, e.g. an investigator using computing device 210 for further investigation.

Thus, a prioritization value may allow prioritizing customer datasets and the prioritization of alerts for customer datasets. An alert may be set, e.g. if a prioritization value indicates that a transaction is responsible for a suspicious behavior of a party. For example, in cases that an alert is produced, e.g. transactions of a customer account may be suspended, e.g. until a transaction has been reviewed by a user, e.g. an investigator.

Prioritization of customer data and alert generation may occur based on a trained ML model. For example, customer datasets may be classified as a prioritized or not prioritized dataset by comparison of vectorized tabular data with threshold values generated in the training of a ML model with a level/degree of certainty or prediction that is based on the trained ML model. Generation of prioritization and alerts based on classification of customer datasets can result in a true positive result in case that a ML model correctly predicts or classifies a dataset as a prioritized dataset; in a true negative result in case that a ML model correctly predicts or classifies a dataset as a non-prioritized dataset; in a false positive result, in case that a ML model incorrectly predicts or classifies a dataset as a prioritized dataset; or in a false negative result in case that a ML model incorrectly predicts or classifies a dataset as a non-prioritized dataset.

Algorithms for training a ML model for the generation of a vector may include XGBoost model, XGBoost, or eXtreme Gradient Boosting, by The XGBoost Contributors and allows a ML model carrying out applications such as regression and classification of data items. For example, XGBoost can be used to build a predictive ML model by combining predictions of multiple individual models, often decision trees, in an iterative manner. Key features of XGBoost Algorithm may include the ability to handle complex relationships in data, regularization techniques to prevent overfitting and incorporation of parallel processing for efficient computation.

An excerpt of an example programming code for training a dataset and predicting a an output in form of a prioritization value based on the trained model may read:

```
from xgboost import XGBClassifier
model = XGBClassifier( )
# fit the model with the training data
model.fit(train_x,train_y)
# predict the target on the train dataset
predict_train = model.predict(train_x)
print('\nTarget on train data',predict_train)
```

An XGB classifier may be imported from a xgboost library. An instance of the XGBClassifier may be created and stored in a variable model. A model may be trained on the training data ("train_x" for features and "train_y" for target labels) using a fit method: The trained model may be used to predict a target label, e.g. for a prioritization value, for a training dataset. The predicted target labels may be set for vectorial representations of training datasets. For example, an input to a ML model may include a vector, e.g. a vector which underwent PCA and may be in form of a principal component representation of a vector. Based on the submitted input to a ML model, an output of the ML model in form of a prioritization value may be generated, e.g. by predicting a fit of the input vector to an output generated from training data in form of a prioritization value. For example, a prioritization value may have a value of 0.62 on a prioritization value scale between 0 and 1. The value of 0.62 may be generated from a vectorial representation X of a customer dataset C by classifying X based on learned training data submitted to the ML model using an XGB classifier.

In the prediction of a prioritization value, a cost function may quantify an error between predicted and expected values for a prioritization value and may present that error in the form of a single real number. For example, an example cost equation 1 may be used to modify an example parameter equation 2 as follows:

$$F_0(x) = \operatorname{argmin}_\gamma \sum_{i=1}^{n} L(y_i, \gamma) \qquad \text{Equation 1}$$

$$\operatorname{argmin}_\gamma \sum_{i=1}^{n} L(y_i, \gamma) = \operatorname{argmin}_\gamma \sum_{i=1}^{n} (y_i - \gamma)^2 \qquad \text{Equation 2}$$

y may be a prediction performed by a ML model, e.g. model 918, and Y may be an actual value of a data item, and a loss function may compare y and Y to generate a value for a misclassification of a prioritization value. Each data item may be analyzed to calculate a loss/cost for an entire ML model. Training of the ML model may allow minimizing the cost function to adjust the model parameters to retrieve accurate predictions for a prioritization value.

Figure 10:
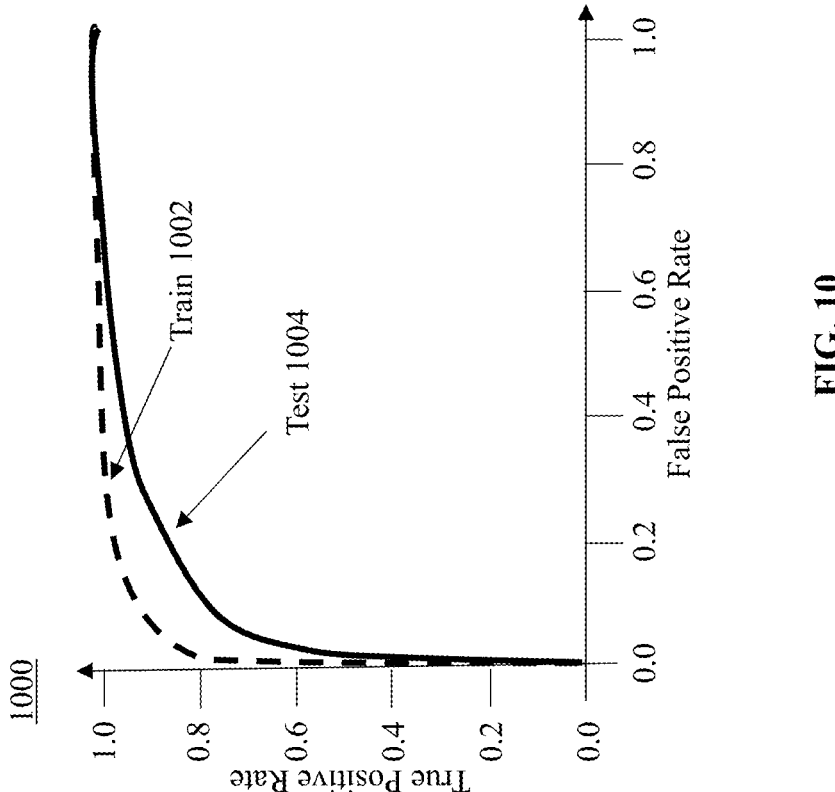
FIG. 10 illustrates example operations in the assessment of a ML model used in the generation of a vectorization of an analysis prompt, according to some embodiments of the present invention.

FIG. 10 illustrates example operations in the assessment of a ML model used in the generation of a vectorization of an analysis prompt. A performance of an example ML model of the invention was analyzed by calculating a receiver operating characteristics (ROC) curve to show the performance of the ML model across all possible classification thresholds. Commonly, LLM based data items may be used to assess metrics that provide insight in the performance of an ML model. As shown in FIG. 10, rates of true positive classifications to false positive classifications for training model 1002 and test model 1004 may be used to compare a ML model based on training datasets 1002 and test datasets 1004. Both graphs can be compared, e.g. based on their ROC curve and derived AUC values. For a ML model 1002 trained on a training dataset, an AUC value of 97% was obtained and for a ML model trained on a test dataset, an AUC value of 92% was obtained.

In the evaluation of produced alerts, e.g. to assess the accuracy of a ML model in producing an alert, alerts generated during the training of a machine learning model using training customer datasets of tabular data may be compared to alerts generated from test customer datasets. Table 2 illustrates precision results based on ML-identified alerts which have been correctly assigned as alerts, herein referred to as "true positive" (TP) alerts, and ML-identified alerts which have been incorrectly assigned as alerts by the ML model, herein referred to as "false positive" (FP) alerts. TPs and FPs for training dataset and test dataset showed an identical precision and 3.65% of alerts have been found to be true positive alerts.

TABLE 2

| Dataset | TP Alerts | FP Alerts | Total Alerts | Precision |
|---|---|---|---|---|
| Training | 2,656 | 70,114 | 72,770 | 3.65% |
| Test | 664 | 17,529 | 18,193 | 3.65% |
| TOTAL | 3,320 | 87,643 | 90,963 | 3.65% |

Figure 11:
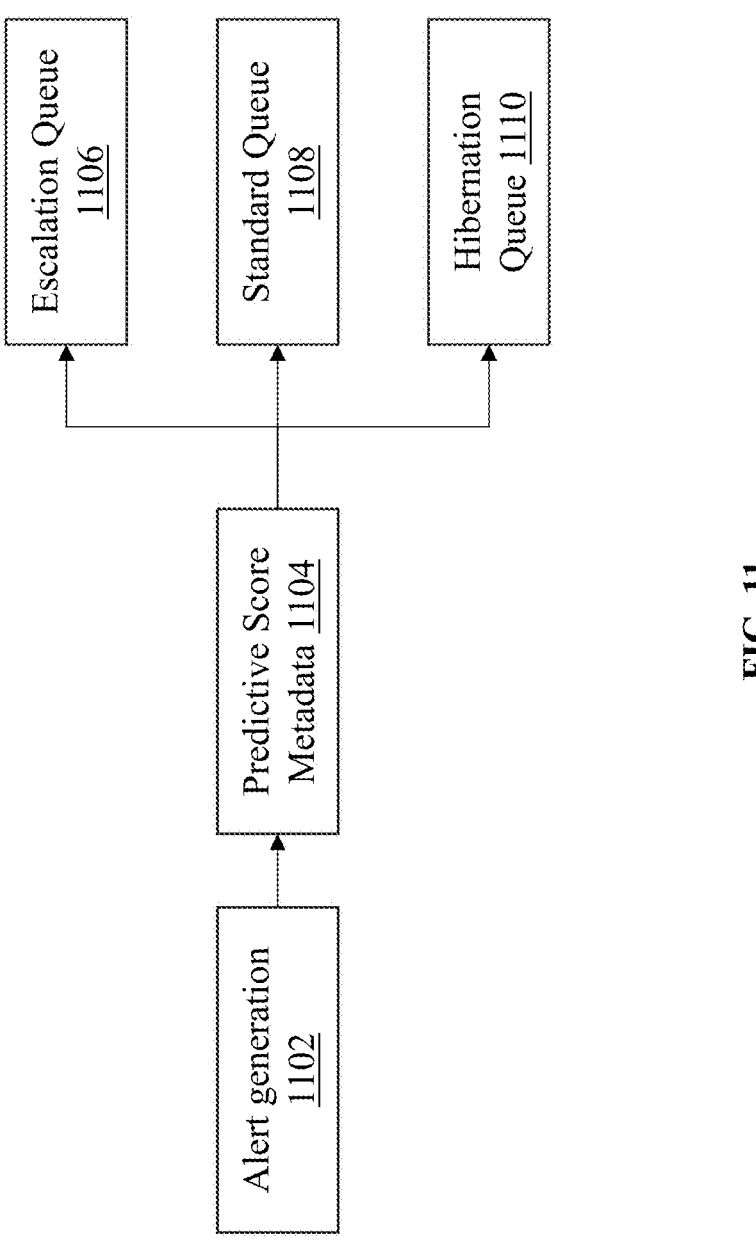
FIG. 11 illustrates an example of a prioritization of customer data sets based on an alert system generate from comparison of a prioritization value of a vector with threshold values, according to some embodiments of the present invention.

FIG. 11 illustrates an example of a prioritization of customer data sets based on an alert system generated from comparison of a prioritization values of a vector with threshold values.

A ML model, e.g. model 918 shown in FIG. 9, may generate a prioritization of customer datasets by comparing a prioritization value of a vector to threshold values. For example, customer datasets may be prioritized based on comparison with a threshold value. A prioritization value for a customer dataset may be compared to a threshold value. Based on the comparison of threshold value to alert threshold value, customer datasets may be prioritized. Further, ML models may be trained to produce an alert 1102 in cases that a prioritization values lies above a threshold value. For example, an alert may be produced when a prioritization value includes a value exceeding $100,000 for a transaction value and comparing a customer dataset including a vector with a transaction value of $100,000 may produce an alert.

For example, alert threshold values, e.g. predictive score metadata items 1104, may be set for three different types of alerts such as escalation, standard and hibernation.

An escalation alert may be an alert which is generated in a case for which a ML model includes no false positive data items but mostly true positive data items. A dataset for which an escalation alert is generated may be added, for example, to escalation queue 1106.

A standard alert may be an alert which is generated in a case for which a ML model included a high score of true positive data items and some false positive data items. A dataset for which an standard alert is generated may be added, for example, to standard queue 1108.

A hibernation alert may be an alert which is generated in a case for which a ML model included no true positive data items and only false positive data items. A dataset for which an hibernation alert is generated may be added, for example, to hibernation queue 1110.

For example, alerts for datasets in an escalation queue 1106 may be prioritized over alerts for datasets in a standard queue 1108 which in turn may be prioritized over alerts for datasets in a hibernation queue 1110.

Table 3 includes an example categorization of produced alerts. As shown in Table 3, an escalation queue includes alerts that may be classed as SAR preparation or Level 2 investigation (top 1% alerts, next 2-<10% of alerts); a standard queue includes alerts that may be classed as Level 1 investigation (10-<70% alerts); and a hibernate queue includes alerts that may be classed as hibernate (70-100% of alerts).

TABLE 3

| Categories | Classification | Alert % (example) |
|---|---|---|
| Escalation | SAR preparation | Top 1% alerts (highest scores) |
| | Level 2 investigation | Next ~9% alerts |
| Standard | Level 1 investigation | Next ~60% alerts |
| Hibernate | Hibernate | Bottom 30% alerts (lowest scores) |

FIG. 12 illustrates an example of a user interface depicting a prioritization of customer data sets based on an alert system generated from a comparison of a prioritization value of a vector with threshold values. Datasets may be ordered in descending prioritization based on their vector values: Datasets with a prioritization value between 0.81 to 0.99 may be prioritized with highest priority. Datasets with a prioritization value between 0.048 to 0.81 may be prioritized in a level 2 investigation. Datasets with a prioritization value between 0.002 to 0.048 may be prioritized in a level 1 investigation. Datasets with a prioritization value between 0.000 to 0.0.002 may be prioritized as hibernate. The prioritization may correspond to the cumulated true positive rate of datasets: For example, datasets with a low cumulated true positive rate are prioritized over datasets with a high true positive rate.

Figure 13:
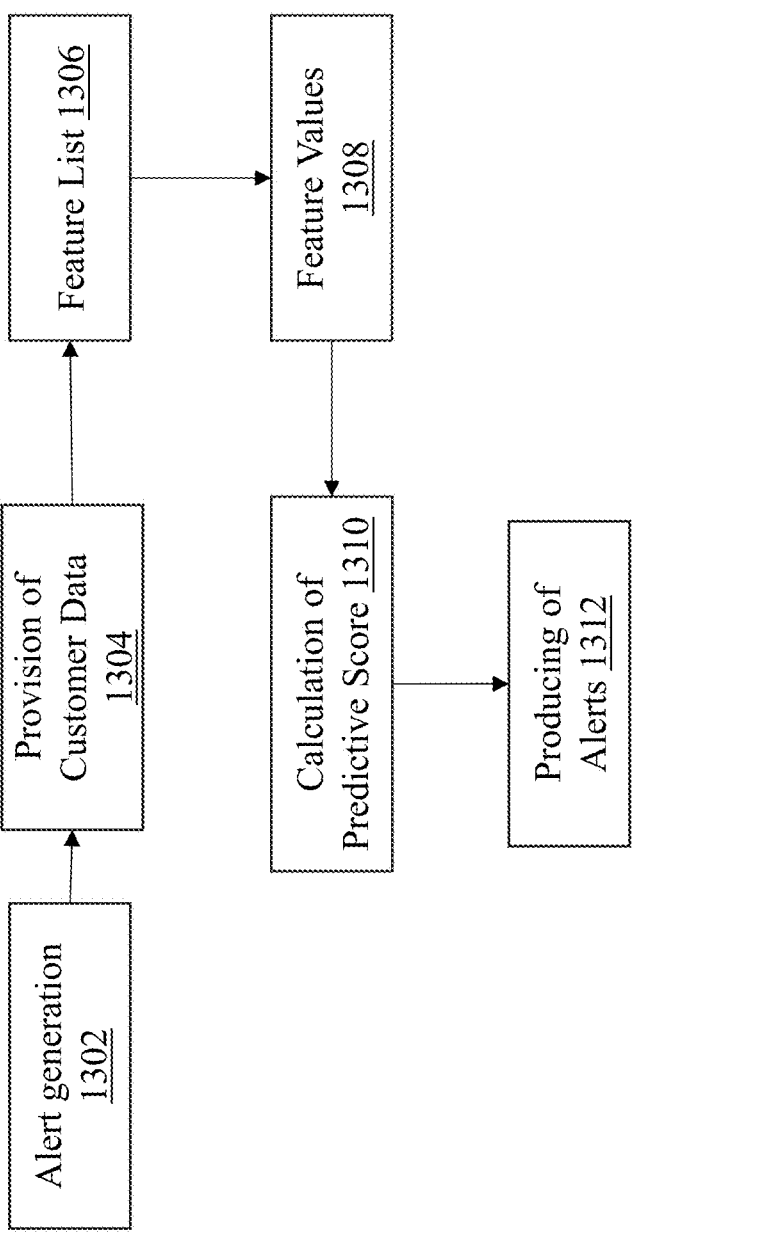
FIG. 13 illustrates the generation of a prioritization of customer data sets using predictive scoring, according to some embodiments of the present invention.

FIG. 13 shows an example of a generation of a prioritization of customer data sets, e.g. using predictive scoring. FIG. 13 is a software architecture diagram and illustrates the generation of a prioritization of customer datasets. In an alert generation (operation 1302), alerts may be generated, e.g. using a Suspicious Activity Monitoring module (SAM), and may be sent to a machine learning training module for the training of a machine learning model. A SAM module may request customer datasets 1304 for the training of a ML model, e.g. for the generation of threshold values for prioritization of customer datasets.

A ML training module may provide a SAM module with a list of data items (e.g. feature list 1306) of a dataset. Values 1308 of data items may be used in the calculation of threshold values (e.g. predictive scores 1310). Threshold values may be rule-based, e.g. rules which can be derived from a training dataset of customer data. A determination of threshold values may be used for a comparison with a prioritization value generated from customer datasets via a ML model.

After receiving data items from a machine learning training module, a SAM module may provide data items of datasets with its threshold values which are used in the prioritization of customer datasets. Once threshold values for the prioritization of customer datasets are generated, a ML model is trained to produce alerts for retrieved vector values. Produced alerts 1312 may be separated into different categories, e.g. into three categories as per score e.g. an escalation queue, general queue and hibernation queue. For example, alerts generated in the training of a ML model may be provided to a user of a ML model, e.g. to review generated alerts.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of prioritizing data, the method comprising, using a computer processor:

using one or more datasets of tabular data to generate one or more analysis prompts, wherein one or more of the datasets are received from one or more computer devices separate from the processor, and wherein one or more of the datasets are transformed into natural language;

applying the one or more analysis prompts to a large language model (LLM) to generate a vector for each customer dataset generating, by a classifier model, a prioritization value based on the generated vector; and generating a prioritization of the one or more datasets by comparing the prioritization value of the vector to threshold values, and producing an alert when the prioritization value of the vector lies above the threshold values.

2. A method according to claim 1, wherein when the prioritization value of the vector lies above the threshold values, suspending a customer account linked to the vector.

3. A method according to claim 1, wherein when the prioritization value of the vector is higher than the threshold values, classifying the dataset as high priority dataset; and when the prioritization value of the vector is lower than the threshold values, classifying the dataset as low priority dataset.

4. A method according to claim 1, wherein the one or more datasets comprise data items selected from a group consisting of categorical data items and numerical data items.

5. A method according to claim 1, wherein the vector undergoes principal component analysis.

6. A method according to claim 1, wherein the one or more datasets of tabular data are converted into an open standard file format prior to the analysis prompt generation.

7. A method according to claim 1, comprising creating the threshold value based on previously recorded datasets comprising customer datasets using machine learning.

8. A method according to claim 1, comprising generating the prioritization by comparing the prioritization value of the vector with predicted vector values.

9. A method according to claim 1, wherein one or more datasets of tabular data comprise data items for which a previously predicted threshold value has been recorded.

10. A system for prioritizing data, the system comprising:

a computing device;

a memory; and a processor, the processor configured to:

use of one or more datasets of tabular data to generate one or more analysis prompts, wherein one or more of the datasets are received from one or more computer devices separate from the processor, and wherein one or more of the datasets are transformed into natural language;

apply the one or more analysis prompts to a large language model (LLM) to generate a vector for each dataset;

generate, by a classifier model, a prioritization value based on the generated vector; and generate a prioritization of the one or more datasets by comparing the prioritization value of the vector to threshold values, and producing an alert when the prioritization value of the vector lies above the threshold values.

11. A system according to claim 10, wherein when the prioritization value of the vector lies above the threshold values, the processor is configured to suspend a customer account linked to the vector.

12. A system according to claim 10, wherein when the prioritization value of the vector is higher than the threshold values, classifying the dataset as high priority dataset; and when the prioritization value of the vector is lower than the threshold values, classifying the dataset as low priority dataset.

13. A system according to claim 10, wherein the one or more datasets comprise data items selected from a group consisting of categorical data items and numerical data items.

14. A system according to claim 10, wherein the vector undergoes principal component analysis.

15. A system according to claim 10, wherein the one or more datasets of tabular data are converted into an open standard file format prior to the analysis prompt generation.

16. A system according to claim 10, wherein the processor is configured to create the threshold values based on previously recorded datasets comprising customer datasets using machine learning.

17. A method of managing data, the method comprising, using a computer processor:

using a plurality of datasets of tabular data to create a plurality of analysis prompts, wherein one or more of the datasets are received from one or more computer devices separate from the processor, and wherein one or more of the datasets are transformed into natural language;

submitting the plurality of analysis prompts to a large language model (LLM) to convert the plurality of analysis prompts into a vector for each dataset;

generating, by a classifier model, a prioritization value based on the generated vector; and comparing the prioritization value of the vector to threshold values to create a prioritization of the plurality of data sets, and producing an alert when the prioritization value of the vector lies above the threshold values.

* * * * *